United States Patent
Gratton

[11] 3,773,618
[45] Nov. 20, 1973

[54] COOLANT SYSTEMS FOR NUCLEAR REACTORS

[75] Inventor: Charles Peter Gratton, Dorchester, Dorset, England

[73] Assignee: United Kingdom Atomic Energy Authority, London, England

[22] Filed: Feb. 6, 1969

[21] Appl. No.: 796,989

[30] Foreign Application Priority Data
Feb. 7, 1968 Great Britain ............... 6,169/68

[52] U.S. Cl. ............. 176/60, 176/61, 176/66, 176/87
[51] Int. Cl. ............. G21c 19/28, G21c 15/00
[58] Field of Search ............ 176/58, 59, 60, 61, 176/64, 65, 87, 78, 45, 77, 66

[56] References Cited
UNITED STATES PATENTS

| | | | |
|---|---|---|---|
| 3,208,913 | 9/1965 | Hennig | 176/58 X |
| 3,244,597 | 4/1966 | Tower | 176/45 X |
| 3,365,366 | 1/1968 | Cundill | 176/58 X |
| 3,378,457 | 4/1968 | Davidson et al. | 176/77 |
| 3,393,128 | 7/1968 | Obertelli et al. | 176/78 |

Primary Examiner—Benjamin R. Padgett
Assistant Examiner—E. E. Lehmann
Attorney—Larson, Taylor and Hinds

[57] ABSTRACT

In some reactors the fuel can be run at temperatures above that required by the heat utilisation plant to which the coolant is supplied. In these reactors a saving in pumping power may be achieved by raising only part of the coolant to core inlet pressure and by-passing the rest around the heat emitting part of the core. The by-pass stream is mixed with the hot outlet coolant at the core outlet to give a bulk coolant at the required temperature.

4 Claims, 3 Drawing Figures

PATENTED NOV 20 1973　　　　　　　　　　　　3,773,618

COOLANT SYSTEMS FOR NUCLEAR REACTORS

BACKGROUND OF THE INVENTION

This invention relates to coolant systems for nuclear reactors and relates in the main to nuclear reactors employing gas as a coolant although the use of other coolants is not excluded where the heat flux in the core is such that the coolant may be brought to a temperature in excess of that required by the heat utilisation plant.

SUMMARY OF THE INVENTION

According to the present invention there is provided a coolant system for a nuclear reactor plant of which the reactor is capable of raising the core coolant to higher temperature than that required by the heat utilisation plant to which the heat generated in the core is transferred, the system including means supplying coolant to the core at a rate appropriate to produce hot coolant at said higher temperature and attemperating the coolant by mixing additional coolant at a lower temperature with it.

The further coolant does not have to suffer the pressure drop which the core coolant undergoes in passing through the core coolant passages and hence the pumping power supplied to force the coolant through the system is appreciably less than that which would be needed to pass the whole of the coolant through the core.

DESCRIPTION OF DRAWINGS

In order that the invention may be better understood embodiments thereof are described below with reference to the accompanying drawings in which.

DESCRIPTION OF THE PREFERRED EMBODIMENT

Figure 1:
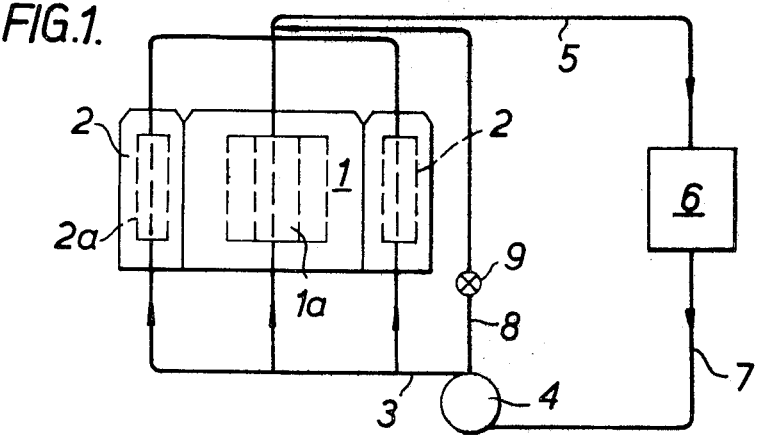
FIG. 1 is a flow diagram of a gas cooled fast breeder nuclear reactor installation showing the coolant flow circuit.

In FIG. 1 a gas cooled fast breeder reactor has a fissile core region 1 and a surrounding annular blanket region 2 containing fertile material. These regions have coolant paths indicated diagrammatically at 1a and 2a respectively and are conveniently defined by the interstices between refractory clad fuel particles in the case of path 1a and the passages between clusters of metal clad fuel pins in the case of path 2a. Both paths 1a, 2a are supplied with coolant gas from an inlet duct 3 by circulator 4 and outlet gas from the paths is delivered via duct 5 wherein the parallel flows mix together. The duct 5 feeds the gas to a heat utilisation plant 6. The latter may be a heat exchanger in which the hot gas gives up its heat to a secondary coolant or it may be a gas turbine supplying shaft power. Cooled gas passes from the plant 6 through outlet duct 7 to the inlet of the circulator 4.

A bypass duct 8 is provided to link the inlet duct 3 and outlet duct 5 so that a proportion of the gas delivered by the compressor bypasses the core. The proportion of coolant which bypasses the core is controlled by a valve 9 in duct 8.

The relative impedances to flow presented by the coolant passages and the bypass duct are such that with valve 9 open the core, which is preferably ceramic, runs near to its maximum temperature. The balance of the coolant flows through the duct 8 and mixes with the outgoing coolant from the core so that the final temperature of the mixed coolant is acceptable to the heat utilisation plant 6. Bypass coolant can be a significant fraction of the total coolant circulated and, as it is passed through a lower impedance path than the core coolant path, pumping power is saved. Moreover, it is available for emergency cooling purposes should the need arise for, by shutting the valve 9, the whole coolant flow can be put through the core regions 1, 2.

Instead of an independant duct 8 as the bypass duct, in certain cases the blanket coolant passages can be employed as the bypass duct in the arrangement shown in FIG. 1.

Figure 2:
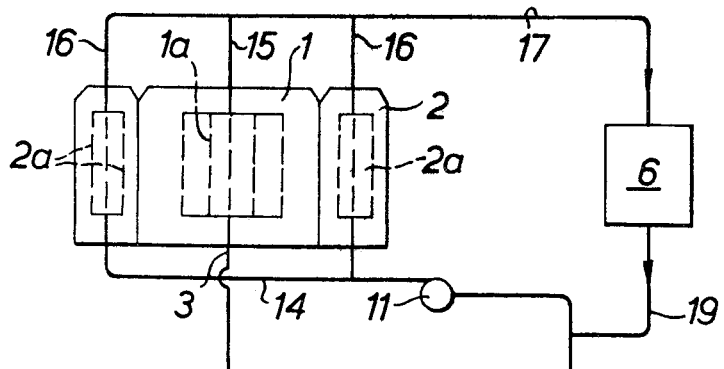
FIG. 2 is a modified form of the installation shown in FIG. 1.

In a modified form of the invention in FIG. 2, for example, the coolant passages through the blanket region of a fast reactor core serve as the function of the bypass duct of FIG. 1.

In FIG. 2 there are two circulators 10, 11 operating in parallel and supplying coolant through ducts 13, 14 respectively leading to the core coolant path 1a and the blanket coolant path 2a. The outlet ducts 15, 16 from both core and blanket regions join a common duct 17, in which the gases mix, leading to a hot gas utilisation plant 6. From the latter, the gas now cooled passes through duct 19 to supply the circulators 10, 11 in parallel.

The coolant path 1a through the core which has a higher heat rating than the path 2a through the blanket, presents the greater impedance to coolant flow. Now, in normal running, the circulators 10, 11 are so adjusted that the proportion of flow delivered by the circulator 10 is restricted to just that necessary to cool the core down to its near maximum operating temperature, whilst the balance of the coolant is circulated by circulator 11 through the blanket. The gas emerging from the coolant path 1a is attemperated by admixture with the cooler gas issuing from the coolant path 2a and the mixture is passed to the hot gas utilisation plant 6.

Figure 3:
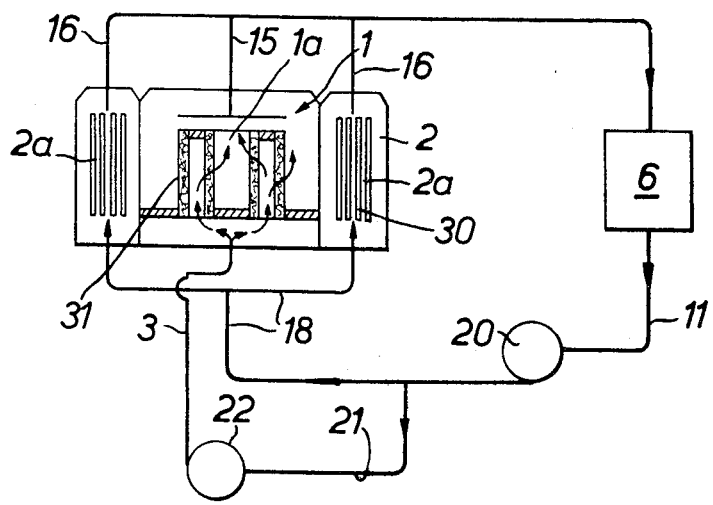
FIG. 3 is a further modification of the installation shown in FIG. 1.

In a further modified form of the invention shown in FIG. 3, the whole of the cooled gas from the heat utilisation plant 6 is raised to the pressure required for lower impedance, bypass, flowpath. In this case the lower impedance flow path 2a is formed by the coolant channels through clusters of fertile fuel pins 30 which form a radial blanket around the right cylindrical core 1. The core 1 is in this case composed of tubular fuel elements 31 having porous walls composed of ceramic clad particles of nuclear fuel the interstices between which particles define the higher impedance coolant passages where the heat flux is greater than that in the blanket. A fuel element of this type is shown in more detail in copending patent application Ser. No. 187,182, filed Oct. 6, 1971. Outlet gas from the circulator 20 is shared between the duct 18 leading to the blanket coolant path 2a and a duct 21 leading to an auxiliary circulator 22. The latter raises the pressure of the proportion of the coolant gas supplied to it, which may be 50 percent or more, to the design pressure required for cooling the fissile region 1 of the core. At this pressure it enters the duct 3 leading to the coolant flowpath 1a extending through the fissile core region.

Where the coolant flows emerge from the core, the hotter flow passes through duct 15 and is attemperated by mixing with the less hot flow from ducts 16 before entering the heat exchanger.

If desired a valve may be provided to divert the coolant intended for the blanket 2 into the duct 3 feeding the fissile region of the core in order to increase the flow through the fissile region of the core on occasion for emergency cooling or other purposes.

I claim:

1. A method of utilizing heat from a nuclear reactor plant wherein hot gas coolant from a nuclear reactor plant is utilized to supply heat to a heat utilization plant and wherein the temperature of the coolant supplied to said heat utilization plant is maintained at a certain constant desired temperature, said method comprising providing a supply of gas coolant, introducing a first gas coolant stream from said supply to said reactor core for flow through a first flow path in said core at a location operating at a temperature such that the gas coolant is heated to a temperature above said certain constant desired temperature, introducing a second gas coolant stream from said supply into said reactor for flow through a second flow path at a location operating at a temperature such that the gas coolant is heated to a temperature below said certain constant desired temperature, said first flow path comprising interstices between fissile fuel particles and having a greater impedance to coolant flow than that of said second flow path, combining the first and second gas coolant streams exiting from said reactor, passing said combined gas coolant streams to said heat utilization plant, and regulating the relative flow rates of said first and second gas coolant streams such that the combined gas coolant stream from said reactor fed to said heat utilization plant is maintained at said certain constant desired temperature.

2. A method according to claim 1 wherein said core is operated at a temperature near its maximum design temperature.

3. A method according to claim 1 wherein said first coolant stream is raised to a high pressure for passage through said reactor core, and said second coolant stream is raised to a lower pressure for passage through said reactor.

4. A method according to claim 1 wherein said second coolant stream passes through a fertile region of the reactor.

* * * * *